United States Patent
Gilliland et al.

(10) Patent No.: US 6,236,535 B1
(45) Date of Patent: May 22, 2001

(54) SPINDLE MOTOR WITH HYDRODYNAMIC BEARING

(75) Inventors: Larry Joe Gilliland, Morgan Hill; Chen-Hsiung Lee, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/123,725

(22) Filed: Jul. 28, 1998

(51) Int. Cl.$^7$ .................................................. G11B 17/02
(52) U.S. Cl. ....................................................... 360/99.08
(58) Field of Search ........................... 360/99.08, 98.07, 360/99.12, 99.05; 384/100, 107, 110, 112, 123, 118; 310/67 R

(56) References Cited

U.S. PATENT DOCUMENTS

| | | | |
|---|---|---|---|
| 4,676,672 | 6/1987 | Tuffy | 384/537 |
| 4,734,606 | 3/1988 | Hajec | 310/90.5 |
| 5,134,331 | 7/1992 | Miyaji et al. | 310/90 |
| 5,396,134 | 3/1995 | Mochizuki | 310/67 |
| 5,427,456 | 6/1995 | Hensel | 384/112 |
| 5,487,608 | 1/1996 | Leuthold et al. | 384/113 |
| 5,516,212 | 5/1996 | Titcomb | 384/107 |
| 5,559,651 | 9/1996 | Grantz et al. | 360/99.08 |
| 5,653,540 | * 8/1997 | Heine et al. | 384/123 |
| 5,705,866 | 1/1998 | Oguchi | 310/67 R |
| 5,707,154 | 1/1998 | Ichiyama | 384/107 |
| 5,713,670 | * 2/1998 | Goldowsky | 384/115 |
| 5,921,731 | * 7/1999 | Chandrasekar | 409/231 |

FOREIGN PATENT DOCUMENTS

| | | |
|---|---|---|
| 6-178490 | 6/1994 | (JP) . |
| 9-191599 | 7/1997 | (JP) . |

\* cited by examiner

Primary Examiner—David L. Ometz
Assistant Examiner—Angel Castro
(74) Attorney, Agent, or Firm—Altera Law Group, LLC

(57) ABSTRACT

The present disclosure relates to a spindle motor having a shaft defining an axial bore that extends completely through the length of the shaft. At least a portion of the axial bore defines a fluid reservoir. A radial passageway extends radially from the fluid reservoir to an exterior surface of the shaft. The spindle motor also includes a pin that seals one end of the axial bore, and a plug that seals an opposite end of the axial bore. The motor further includes a rotor member that is rotatably mounted on the shaft. A bearing fluid forms a hydrodynamic bearing between the exterior surface of the shaft and the rotor member. The bearing fluid at least partially fills the fluid reservoir and the radial passageway.

12 Claims, 3 Drawing Sheets

SPINDLE MOTOR WITH HYDRODYNAMIC BEARING

BACKGROUND OF THE INVENTION

1. Field of the Invention

This invention relates in general to spindle motors for use in magnetic disc storage systems. More particularly, this invention relates to magnetic disc storage systems having spindle motors that use hydrodynamic bearings.

2. Description of Related Art

Data storage systems, such as disk drives, commonly make use of rotating storage disks. The storage disks are commonly magnetic disks but could also be optical. In a typical magnetic disk drive, a magnetic disk rotates at high speed and a transducing head uses air pressure to "fly" over the top surface of the disk. The transducing head records information on the disk surface by impressing a magnetic field on the disk. Information is read back using the head by detecting magnetization of the disk surface. The magnetic disk surface is divided in a plurality of concentric tracks. By moving the transducing head radially across the surface of the disk, the transducing head can read information from or write information to different tracks of the magnetic disk.

Spindle motors are commonly used to rotate magnetic disks at high speeds. Frequently, conventional spindle motors comprise small electric motors equipped with standard ball bearings. However, electric motors having ball bearings are known to experience problems such as runout or vibration that can prevent information from being accessed from disks rotated by the motors. This is especially true as advancements in data storage technology have increased magnetic disk storage densities. To overcome the problems associated with ball bearing electric motors, some disk drive systems now make use of electric motors having fluid hydrodynamic bearings. Bearings of this type are shown in U.S. Pat. No. 5,427,546 to Hensel, U.S. Pat. No. 5,516,212 to Titcomb and U.S. Pat. No. 5,707,154 to Ichiyama.

An exemplary hydrodynamic bearing typically includes a stationary shaft on which is mounted a rotary hub to which magnetic disks can be secured. There is no direct contact between the rotating hub and the shaft. Instead, a lubricating fluid forms a hydrodynamic bearing between the shaft and the rotary hub. Hydrodynamic pressure or pumping is frequently provided by a pattern of grooves, commonly in a herringbone configuration, defined either by the exterior surface of the shaft or the interior surface of the rotary hub. During rotation of the hub, the pattern of grooves provides sufficient hydrodynamic pressure to cause the lubricating fluid to act as a hydrostatic bearing between the shaft and the rotary hub. Frequently, capillary seals are used to retain the bearing fluid between the shaft and the rotary hub.

In certain prior art electric motors having hydrodynamic bearings, the shaft defines an axial bore that provides a reservoir for bearing fluid. In certain of such prior art motors, the axial bore has only one open end that is closed by a pin which is press fit within the bore. Because the bore has only one open end, the bore is difficult to clean. Consequently, it is possible for debris left within the bore to contaminate the bearing fluid. Additionally, when the pin is press fit within the bore, wear debris is generated by the pressing operation. This wear debris can contaminate the bearing fluid of the hydrodynamic bearing and lead to premature wear and failure of the electric motor.

SUMMARY OF THE INVENTION

One aspect of the present invention relates to a spindle motor including a shaft defining an axial bore extending completely through a length of the shaft. At least a portion of the axial bore defines a fluid reservoir. The shaft also defines a radial passageway extending radially from the fluid reservoir to an exterior surface of the shaft. A pin seals one end of the axial bore, while a plug seals the other end of the axial bore. The fluid reservoir is positioned between the pin and the plug. A rotor member to which a storage disk can be secured is rotatably mounted on the shaft. The motor further includes a bearing fluid adapted to form a hydrodynamic bearing between the exterior surface of the shaft and the rotor member. The bearing fluid at least partially fills the fluid reservoir and the radial passageway. In certain embodiments of the present invention, the plug and the pin are secured within the axial bore by adhesive.

Another aspect of the present invention relates to a spindle motor as described above that is incorporated within a data storage system.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
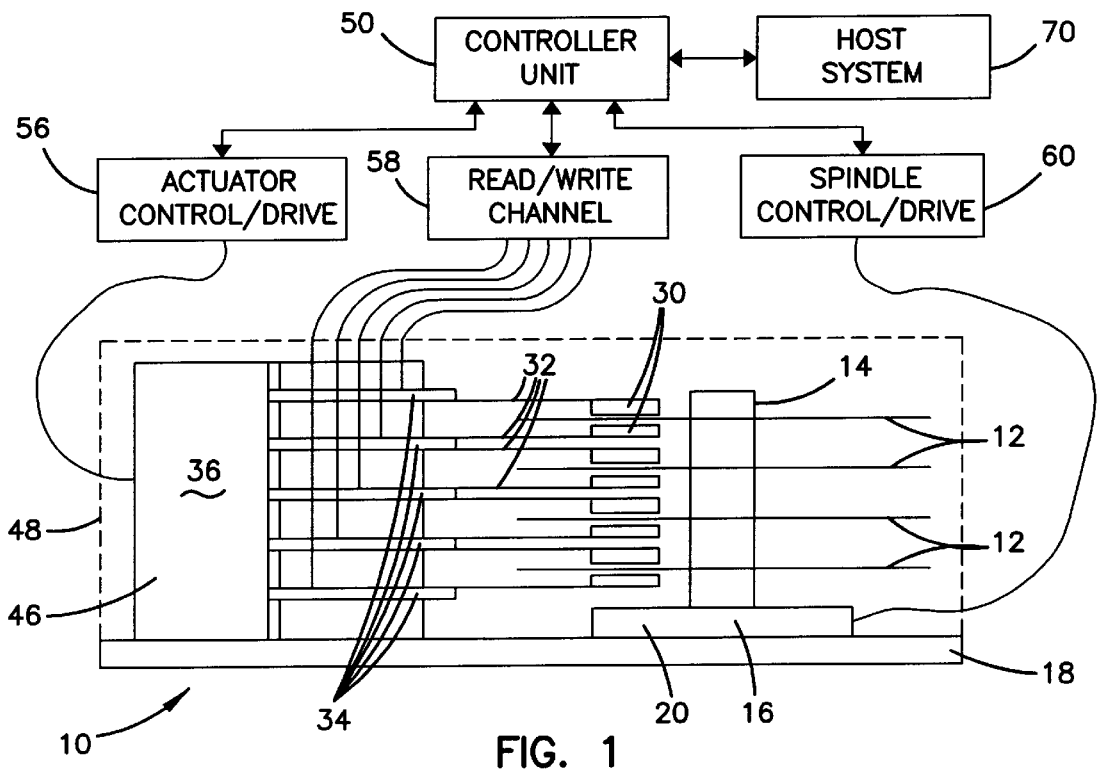
FIG. 1 is a schematic diagram of a data storage system.

FIG. 1 shows a schematic diagram of a data storage system 10 suitable for practicing the present invention. System 10 comprises a plurality of magnetic recording disks 12. Each disk has a plurality of concentric data tracks. Disks 12 are mounted on a spindle motor shaft 14 which is connected to a spindle motor 16. Motor 16 is mounted to a chassis 18. The disks 12, spindle 14, and motor 16 comprise a disk stack assembly 20.

A plurality of sliders 30 having read/write heads are positioned over the disks 12 such that each surface of the disks 12 has a corresponding slider 30. Each slider 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The sliders 30, suspensions 32, arms 34, and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central a processing unit (CPU), memory unit and other digital circuitry. Controller 50 is connected to an actuator control/drive unit 56 which in turn is connected to actuator 36. This allows controller 50 to control the movement of sliders 30 over disks 12. The controller 50 is a connected to a read/write channel 58 which in turn is connected to the heads of the sliders 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored disks 12, or may request that digital data be read from disks 12 and sent to the system 70. The basic operation of DASD units is well known in the art and is described in more detail in *Magnetic Recording Handbook*, C. Dennis Mee and Eric D. Daniel, McGraw Hill Book Company, 1990.

Figure 2:
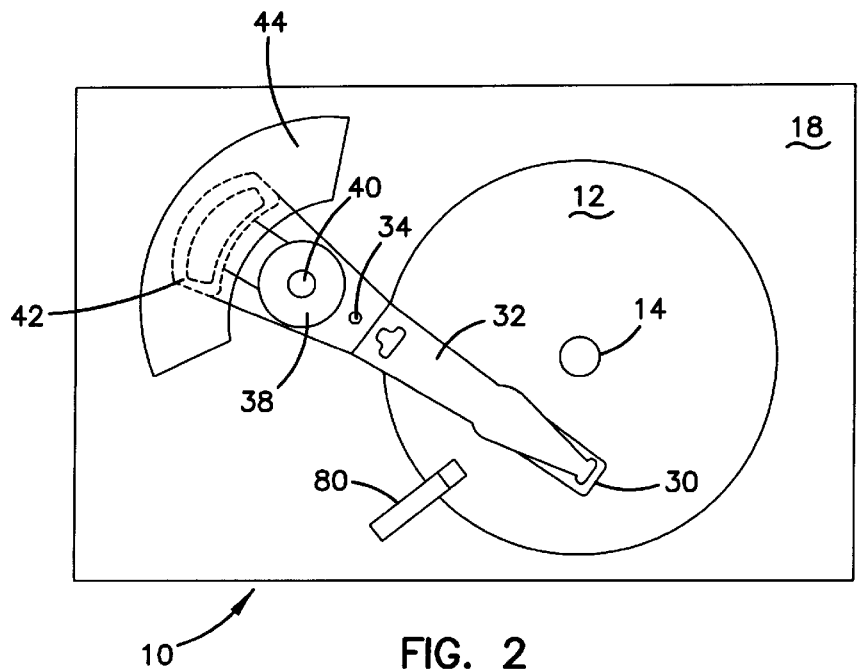
FIG. 2 is a top view of the system of FIG. 1.

FIG. 2 shows top view of system 10. A loading ramp member 80 is located at the edge of the disk stack assembly 20. Member 80 automatically unloads the sliders 30 from the disks 12 as actuator 36 moves the sliders 30 to the outer disk position. To unload a slider or head means to move it a vertical distance away from its corresponding disk surface. The ramp 80 is optional. Alternatively, the sliders 30 may be placed permanently in the loaded position between the disks.

Figure 3:
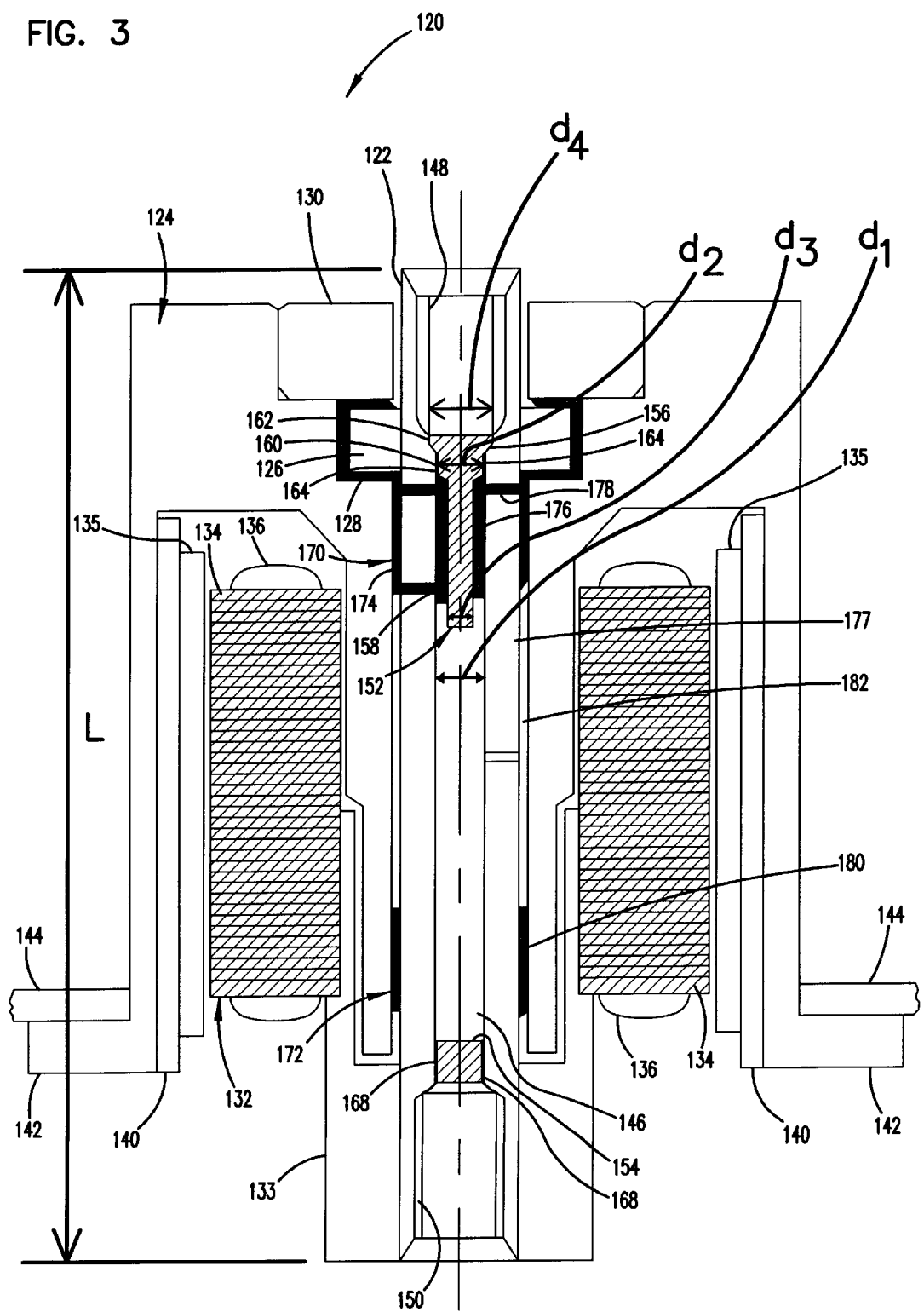
FIG. 3 is a cross-sectional view bisecting an embodiment of a spindle motor constructed in accordance with the principles of the present invention.

FIG. 3 is diagramatic cross-sectional view of a spindle motor 120 that is an embodiment of the present invention. A preferred application of the spindle motor is in data storage systems such as the disk drive system 10 illustrated in FIGS. 1 and 2.

The spindle motor 120 generally includes a stationary shaft 122 and a rotor member 124 rotatably mounted on the shaft 122. A thrust plate 126 is fixedly connected to the shaft 122. The thrust plate 126 is captured between a shoulder 128 of the rotor member 124 and a cover plate 130 that is fixedly connected to the rotor member 124. Interference between the cover plate 130 and the thrust plate 126, and between the shoulder 128 and the thrust plate 126, prevent the rotor member 124 from becoming axially displaced from the shaft 122. The spindle motor 120 also includes a stator 132 that is fixedly connected to a base 133 in which a lower end of the shaft 122 is press fit. The stator includes a plurality of laminar plates 134 and coils 136 disposed about the plates 134. One or more magnet elements 135 are positioned directly outside the stator 132. The magnetic elements 135 are secured to the inside of the rotor member by a magnetic sleeve or back iron 140. The rotor member 124 includes a flange 142 that projects radially outward from a main body of the rotor member 124. A storage medium 144 such as a magnetic disk is secured to the flange 142.

The shaft 122 of the spindle motor 120 includes an axial bore 146 that extends completely through a length L of the shaft 122. An upper portion 148 and a lower portion 150 of the axial bore 146 have been tapped with internal threads.

The tapped upper portion 148 allows a cover to be bolted to the spindle motor 120, while the tapped lower portion 150 allows the shaft 122 to be bolted to a disk drive chassis such as the chassis 18 of the data storage system 10 shown in FIGS. 1 and 2.

The spindle motor 120 also includes a pin 152 that seals one end of the axial bore 146 and a plug 154 that seals an opposite end of the axial bore 146. The plug 154 is generally cylindrical. The pin 152 includes a head portion 156 and an elongate portion 158 that extends longitudinally from the head portion 156 along the axial bore 146. The head portion 156 of the pin 152 includes a generally cylindrical portion 160 and a lip portion 162 that projects radially outward from the cylindrical portion 160.

Both the pin 152 and the plug 154 are preferably secured within the axially bore 146 by an adhesive such as epoxy. For example, the pin 152 is secured within the axial bore 146 by a layer of adhesive 164 positioned between the generally cylindrical portion 160 of the plug 154 and the interior surface of the shaft 122. Similarly, the plug 154 is shown secured within the axial bore 146 by an adhesive layer 168 positioned between the outer surface of the plug 154 and the interior surface of the shaft 122. Each of the adhesive layers 164 and 168 preferably has a thickness in the range of 5–20 microns.

By way of nonlimiting example, the axial bore 146 can have a diameter $d_1$, in the range of 2–2.5 millimeters, the plug 154 and the cylindrical portion 160 of the pin 152 can have diameters $d_2$ in the range of 2–2.5 millimeters, the elongated portion 158 of the pin 152 can have a diameter $d_3$ in the range of 1.9–2.4 millimeters, and the lip portion 162 of the pin 152 can have a diameter $d_4$ in the range of 2.5–3 millimeters. For certain embodiments, the diameters $d_2$ of the cylindrical portion 160 and the plug 154 are in the range of 5–20 microns smaller than the diameter $d_2$ of the axial bore 146. In such embodiments, a clearance of 5–20 microns exist between the cylindrical portion 160 and the interior surface 166 of the shaft, and between the plug 154 and the interior surface 166 of the shaft 122. Such clearance provides volume or space for allowing a desired thickness of adhesive to be placed between the cylindrical portion 160 and the interior surface 166 of the shaft 122, and between the plug 154 and the interior surface 166 of the shaft 122.

The pin 152 and the plug 154 can also be secured within the axial bore 146 by a heat shrinking technique. For example, the shaft 122 can be cooled prior to placing the pin 152 and the plug 154 within the bore 146. By cooling the shaft 122 with a coolant such as liquid nitrogen, the diameter of the bore 146 of the shaft 122 is expanded. The pin 152 and the plug 154 are placed in the bore 146 while the shaft is cold. Subsequently, the shaft 122 is allowed to warm to room temperature. As the shaft 122 warms, the diameter of the bore 146 constricts causing the pin 152 and the plug 154 to be pressed within the bore 146. In this manner, friction retains the pin 152 and the plug 154 within the bore 146. A shrink fit connection, as described above, can also be provided by cooling the pin 152 and the plug 154 as opposed to the shaft 122.

Because the axial bore 146 extends completely through the length L of the shaft 122, of the interior surface 166 of the shaft 122 can effectively be cleaned by conventionally known techniques such as an ultrasonic bath. Also, because the pin 152 and the plug 154 are glued or shrink-fitted into the axial bore 146, debris associated with press-fit operations is not generated.

Friction between the shaft 122 and the rotor member 124 is inhibited through the use of upper and lower hydrodynamic bearings 170 and 172. The upper hydrodynamic bearing 170 includes a bearing fluid 174 such as lubricating fluid or oil. The bearing fluid 174 is positioned between the shaft 122 and the rotor member 124, between the thrust plate 126 and the rotor member 124, and between the top of the thrust plate 126 and the bottom of the cover plate 130. The bearing fluid 174 is also provided in a fluid reservoir 176 formed between the elongate portion 158 of the pin 152 and the interior surface 166 of the shaft 122. Fluid communication between an exterior surface 177 of the shaft 122 and the fluid reservoir 176 is provided by radial passageways 178 that extend radially from the fluid reservoir 176 to the exterior surface 177 of the shaft 122.

The lower hydrodynamic bearing 172 is formed by a bearing fluid 180 such as lubricating fluid or oil. The bearing fluid 180 is positioned between the exterior surface 177 of the shaft 122 and the rotor member 124. A volume 182 between the upper and lower hydrodynamic bearings 170 and 172 is typically filled with air. Bearing fluid movement between the upper and lower hydrodynamic bearings 170 and 172 is preferably inhibited by conventional techniques such as capillary seals. Similarly, the bearing fluid is inhibited from escaping the spindle motor 122 by similar conventionally known sealing techniques.

Figure 4:
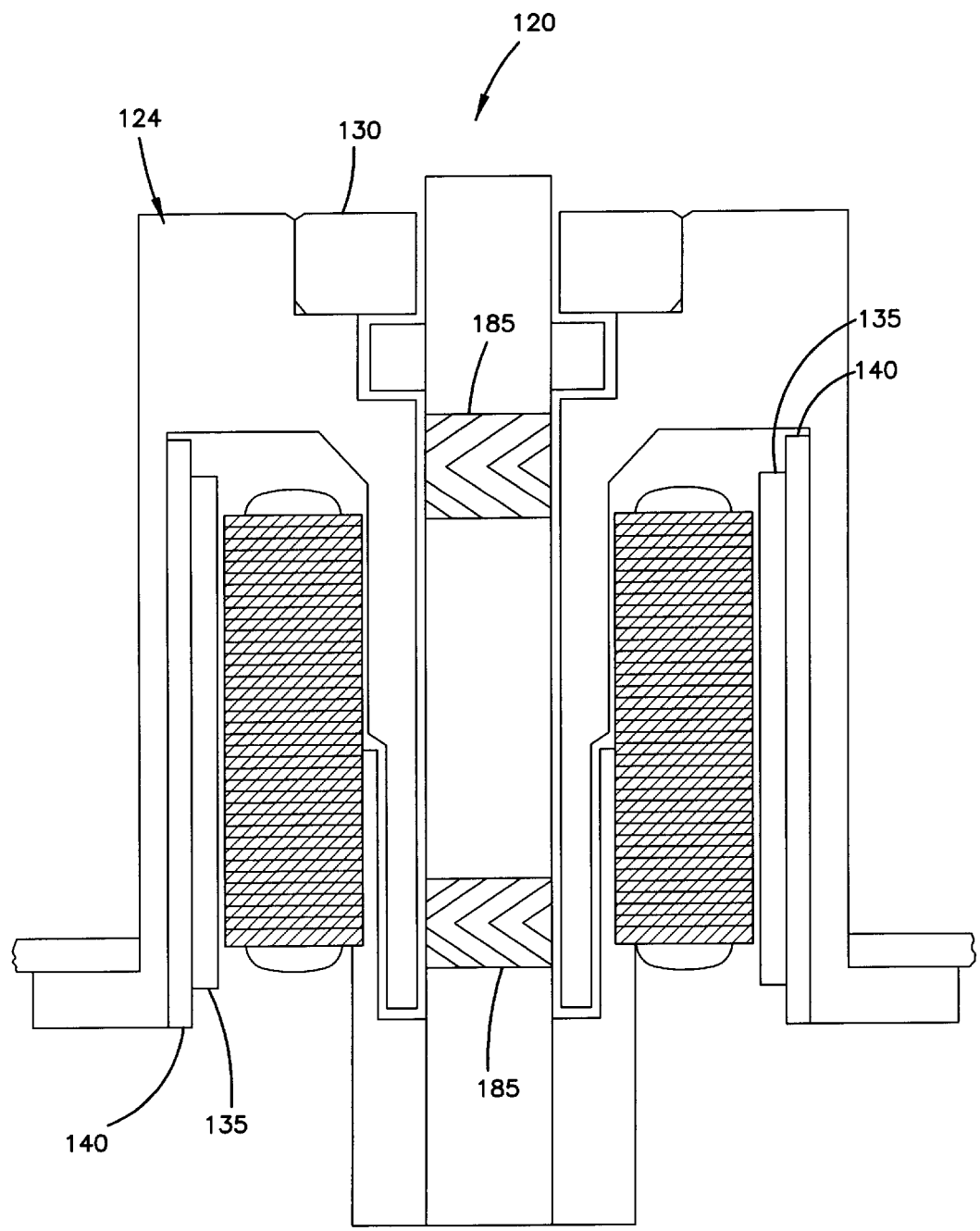
FIG. 4 is a cross-sectional view of the spindle motor of FIG. 3 with the shaft removed.

Hydrodynamic pressure for pressurizing the bearing fluid 174 and 180 is preferably provided by any number of known techniques. For example, as shown in FIG. 4, herringbone patterns of grooves 185 have been provided within the interior surface of the rotor member 124 at positions adjacent to the upper and lower hydrodynamic bearings 170 and 172. When the rotor member 124 is rotated relative to the shaft 122, the herringbone patterns of grooves 185 generate pumping actions which pressurize the bearing fluids 174 and 180. It will be appreciated that a similar herringbone pattern is also preferably provided on the top and bottom surfaces of the thrust plate 126. Additionally, it will be appreciated that a herringbone pattern can also be formed on the exterior surface 177 of the shaft 122 to achieve a similar pumping effect.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A spindle motor comprising:
 a shaft defining an axial bore extending completely through a length of the shaft, at least a portion of the axial bore defining a fluid reservoir, the shaft also defining a radial passageway extending radially from the fluid reservoir to an exterior surface of the shaft;
 a pin that seals the axial bore, the pin being secured within the bore by one of an adhesive connection and a shrink-fit connection, the pin includes a head portion and an elongate portion extending longitudinally from the head portion along the axial bore, the elongate portion having a reduced diameter as compared to the head portion, wherein the fluid reservoir is formed along the elongate portion of the pin;
 a plug that seals the axial bore, the pin and plug being positioned within the axial bore such that the fluid reservoir is located between the pin and the plug, the plug being secured within the bore by one of an adhesive connection and a shrink-fit connection;
 a rotor member to which a storage disc can be secured, the rotor member being rotatably mounted on the shaft; and
 a bearing fluid adapted to form a hydrodynamic bearing between the exterior surface of the shaft and the rotor member, the bearing fluid at least partially filling the fluid reservoir and the radial passageway.

2. The spindle motor of claim 1, wherein the adhesive connections are provided by an epoxy.

3. The spindle motor of claim 1, wherein the head portion includes a generally cylindrical portion and a lip portion that projects radially outward from the cylindrical portion.

4. The spindle motor of claim 3, wherein a layer of adhesive is formed between the cylindrical portion and the shaft for securing the pin within the axial bore of the shaft.

5. The spindle motor of claim 4, wherein the cylindrical portion has a diameter that is 5–20 microns smaller than a diameter of the axial bore.

6. The spindle motor of claim 1, wherein the plug has a diameter that is 5–20 microns smaller than a diameter of the axial bore.

7. A data storage device comprising:
 a motor including: a shaft defining an axial bore extending completely through a length of the shaft, at least a portion of the axial bore defining a fluid reservoir, the shaft also defining a radial passageway extending radially from the fluid reservoir to an exterior surface of the shaft; a pin that seals the axial bore and is secured within the axial bore by one of an adhesive connection and a shrink-fit connection, the pin includes a head portion and an elongate portion extending longitudinally from the head portion along the axial bore, the elongate portion having a reduced diameter as compared to the head portion, wherein the fluid reservoir is formed along the elongate portion of the pin; a plug that seals the axial bore and is secured within the axial bore by one of an adhesive connection and a shrink-fit connection, the pin and the plug being positioned within the axial bore such that the fluid reservoir is located between the pin and the plug; a rotor member rotatably mounted on the shaft; and a bearing fluid adapted to form a hydrodynamic bearing between the exterior surface of the shaft and the rotor member, the bearing fluid at least partially filling the fluid reservoir and the radial passageway;
 a storage medium coupled to the rotor member;
 a transducer for reading from and writing to the storage medium;
 an actuator assembly for moving the transducer relative to the storage medium.

8. The spindle motor of claim 7, wherein the pin is secured within the axial bore by adhesive.

9. The spindle motor of claim 7, wherein the plug is secured within the axial bore by adhesive.

10. The spindle motor of claim 7, wherein both the pin and the plug are secured within the axial bore by adhesive.

11. The spindle motor of claim 7, wherein the head portion includes a generally cylindrical portion and a lip portion that projects radially outward from the cylindrical portion.

12. The spindle motor of claim 11, wherein a layer of adhesive is formed between the cylindrical portion and the shaft for securing the pin within the axial bore of the shaft.

* * * * *